(12) United States Patent
Fushimi

(10) Patent No.: US 9,868,425 B2
(45) Date of Patent: Jan. 16, 2018

(54) SADDLE RIDING TYPE VEHICLE

(71) Applicant: YAMAHA HATSUDOKI KABUSHIKI KAISHA, Shizuoka (JP)

(72) Inventor: Takanobu Fushimi, Shizuoka (JP)

(73) Assignee: YAMAHA HATSUDOKI KABUSHIKI KAISHA, Iwata-shi, Shizuoka (JP)

( * ) Notice: Subject to any disclaimer, the term of this patent is extended or adjusted under 35 U.S.C. 154(b) by 0 days.

(21) Appl. No.: 14/307,300

(22) Filed: Jun. 17, 2014

(65) Prior Publication Data

US 2014/0368026 A1 Dec. 18, 2014

(30) Foreign Application Priority Data

Jun. 18, 2013 (JP) .................................. 2013-127825

(51) Int. Cl.
| | |
|---|---|
| *B60T 11/10* | (2006.01) |
| *B62L 3/02* | (2006.01) |
| *B62L 3/08* | (2006.01) |
| *B62K 23/06* | (2006.01) |

(52) U.S. Cl.
CPC ............ *B60T 11/101* (2013.01); *B62K 23/06* (2013.01); *B62L 3/023* (2013.01); *B62L 3/08* (2013.01)

(58) Field of Classification Search
CPC .... B60T 11/101; B60T 11/046; B60T 8/1766; B60T 8/261; B62L 3/08; B62L 3/023; B62K 23/06
See application file for complete search history.

(56) References Cited

U.S. PATENT DOCUMENTS

2006/0152071 A1   7/2006   Takeuchi

FOREIGN PATENT DOCUMENTS

| CN | 1138541 A | 12/1996 |
|---|---|---|
| CN | 1339378 A | 3/2002 |
| CN | 101239639 A | 8/2008 |
| EP | 1955938 A2 | 8/2008 |
| EP | 1955938 B1 | 3/2012 |
| FR | 2 735 440 A1 | 12/1996 |
| JP | 6-321164 A | 11/1994 |
| JP | 10-273087 A | 10/1998 |
| JP | 3573896 B2 | 10/2004 |
| JP | 2006-199275 A | 8/2006 |
| JP | 2008-290699 A | 12/2008 |

(Continued)

OTHER PUBLICATIONS

Office Action dated Oct. 26, 2016 for Corresponding Taiwanese Patent Application No. 103119756.

(Continued)

*Primary Examiner* — Xuan Lan Nguyen
(74) *Attorney, Agent, or Firm* — Rabin & Berdo, P.C.

(57) ABSTRACT

An interlocking brake system structure provides braking force in response to a force caused by operation of brake levers even when disk brakes are used for both front and rear wheel brakes. A saddle riding type vehicle includes an interlocking brake lever on a second handle from among the left handle and the right handle to interlock a front wheel brake device and a rear wheel brake device. An operation force distributor distributes operation force, caused by an operation of the interlocking brake lever, between the front wheel brake device and the rear wheel brake device. An interlocking wire receives and transmits the operation force distributed at the operation force distributor to the front wheel brake device.

18 Claims, 6 Drawing Sheets

(56) References Cited

FOREIGN PATENT DOCUMENTS

| | | |
|---|---|---|
| TW | 374746 | 11/1999 |
| TW | 388381 U | 4/2000 |
| TW | 200918406 A | 5/2009 |
| TW | I391285 B | 4/2013 |

OTHER PUBLICATIONS

Chinese Office Action dated Jan. 25, 2017 in Chinese patent application No. 201410272792.8.
Chinese Office Action dated Jul. 27, 2017 in Chinese patent application No. 201410272792.8.

SADDLE RIDING TYPE VEHICLE

This application is based on, and claims priority to, Japanese Patent Application No. 2013-127825, filed on Jun. 18, 2013 the contents of which are incorporated herein by reference.

BACKGROUND

Technical Field

The present invention relates to a saddle riding type vehicle having brake levers on the left handle and the right handle.

Description of the Background Art

A saddle riding type vehicle as disclosed by JP-A 2008-290699 that has brake levers on the left handle and the right handle has been known. The saddle riding type vehicle has a front wheel brake lever on one of the left handle and the right handle and an interlocking brake lever provided at the other of the left handle and the right handle. The front wheel brake lever is connected to a master cylinder provided in the vicinity of the interlocking brake lever through a transmission cable. The hydraulic pressure in the master cylinder changes in response to operation of the front wheel brake lever. The hydraulic pressure change generated in the master cylinder is transmitted to the brake pad of a caliper through a hydraulic path. In this way, the brake pad is pressed against a brake disk and braking force is generated.

The interlocking brake lever is provided with an arm that changes the hydraulic pressure in the master cylinder of the front wheel brake and connected with a rear wheel brake cable through an equalizer. The equalizer distributes force caused by operating the interlocking brake lever between the front wheel brake and the rear wheel brake. The equalizer allows the front wheel brake and the rear wheel brake to be activated in response to operation of the interlocking brake lever.

In the disclosure of JP-A 2008-290699, a brake disk is used for the front wheel brake and a so-called drum brake is used for the rear wheel brake. A brake structure having disk brakes for both front and rear wheels is also known as a general brake structure for a saddle riding type vehicle. Therefore, if disk brakes are used for both front and rear wheels brakes, an interlocking brake may be employed similarly to the structure disclosed by JP-A 2008-290699.

In the structure disclosed by JP-A 2008-290699, if the drum brake as the rear wheel brake is simply exchanged with a disk brake, a master cylinder for the rear wheel brake must be provided somewhere between the interlocking brake lever and the rear wheel. In this case, the interlocking brake lever and the master cylinder for the rear wheel brake must be connected using a transmission cable.

Here, using the transmission cable, the efficiency of transmitting operation force is lower than the case of transmitting hydraulic pressure in the hydraulic path and braking force generated by the brakes is reduced. As described above, if the rear wheel brake is simply exchanged with a disk brake in the structure disclosed by JP-A 2008-290699, an increased number of transmission cables is necessary and the cables should be longer. Therefore, braking force generated by the brakes in response to operation force would be reduced, which makes the brake system less efficient.

SUMMARY

A saddle riding type vehicle according to one embodiment of the invention includes a front wheel; a rear wheel; a handle that includes a left handle and a right handle, and maneuvers a direction of the front wheel; a front wheel brake device that applies a brake on the front wheel; a rear wheel brake device that applies a brake on the rear wheel; a front wheel brake lever provided on one of the left handle and the right handle to activate the front wheel brake device; an interlocking brake lever provided on the other of the left handle and the right handle to interlock the front wheel brake device and the rear wheel brake device; an operation force distributor that distributes operation force input to the interlocking brake lever between the front wheel brake device and the rear wheel brake device; and an interlocking wire that transmits the operation force distributed at the operation force distributor to the front wheel brake device. The front wheel brake device includes a front wheel brake cylinder and a front wheel brake. The front wheel brake cylinder is provided on the one of the left handle and the right handle together with the front wheel brake lever. In the front wheel brake cylinder, a hydraulic pressure change is generated by operation of the front wheel brake lever and by transmission of the operation force through the interlocking wire. The front wheel brake operates in response to the hydraulic pressure change generated in the front wheel brake cylinder. The rear wheel brake device includes a rear wheel brake cylinder and a rear wheel brake. The rear wheel brake cylinder is provided on the other of the left handle and the right handle together with the interlocking wheel brake lever. In the rear wheel brake cylinder, a hydraulic pressure change is generated by operation of the interlocking wheel brake lever. The rear wheel brake operates in response to the hydraulic pressure change generated in the rear wheel brake cylinder (a first feature).

In the above-described structure, the front wheel brake cylinder and the rear wheel brake cylinder are provided on the left handle and the right handle. The rear wheel brake cylinder has a hydraulic pressure change generated by operation of the interlocking brake lever. The front wheel brake cylinder has a hydraulic pressure change generated by operating the front wheel brake lever. The front wheel brake cylinder also has a hydraulic pressure change generated by force caused by operating the interlocking brake lever which is distributed at operation force distributor and which is transmitted through the interlocking wire. In this way, in the above-described structure, the interlocking wire that transmits the operation force is provided to connect the operation force distributor and the front wheel brake cylinder.

Therefore, in the above-described structure, the number of wires connecting the brake levers and the brake devices can be reduced and the length of the wires can be reduced as much as possible as compared to the case of employing disk brakes in the conventional structure.

In this way, reduction in the operation force transmitted through the wires can be restrained and braking force as designed that acts efficiently in response to operation force can be provided.

In the first feature, the operation force distributor is provided adjacent to the interlocking brake lever so that force which is caused by operation of the interlocking brake lever is directly transmitted thereto (a second feature).

Since force caused by operating the interlocking brake lever is directly transmitted to the operation force distributor, loss of the force while being transmitted from the interlocking brake lever to the operation force distributor can be prevented. In this way, braking force as designed that acts efficiently in response to the operation force can be provided on the front and rear brake devices.

In the first or second feature, the saddle riding type vehicle further includes a transmission member for the front wheel brake provided adjacent to the front wheel brake lever to generate a hydraulic pressure change in the front wheel brake cylinder by operation of the front wheel brake lever. The transmission member for the front wheel brake is connected to the interlocking wire so that a hydraulic pressure change in the front wheel brake cylinder is also generated by operation force transmitted through the interlocking wire (a third feature).

Operation of the front wheel brake lever and the operation force transmitted through the interlocking wire can be transmitted to the front wheel brake cylinder by the transmission member for the front wheel brake. In this way, the front wheel brake lever and the interlocking brake lever allow a hydraulic pressure change to be generated in the front wheel brake cylinder which is provided on one of the left handle and the right handle together with the front wheel brake lever.

In the third feature, the saddle riding type vehicle further includes a connection member that connects the interlocking wire and the transmission member for the front wheel brake. The connection member is connected to an end of the interlocking wire, so that the connection member can transmit the operation force transmitted through the interlocking wire to the transmission member for the front wheel brake and the connection member can move with respect to the transmission member for the front wheel brake during operation of the front wheel brake lever (a fourth feature).

The force, which is caused by operating the interlocking brake lever, distributed at the operation force distributor and transmitted through the interlocking wire, is transmitted to the front wheel brake cylinder by the connection member and the transmission member for the front wheel brake. On the other hand, during operating the front wheel brake lever, the transmission member for the front wheel brake moves with respect to the connection member connected to the end of the interlocking wire, so that the interlocking wire can be prevented from being pressed by the operation of the front wheel brake lever through the transmission member for the front wheel brake. Therefore, the interlocking wire can be prevented from being damaged by excess force applied thereupon.

In the fourth feature, the transmission member for the front wheel brake is provided rotatably with respect to the front wheel brake cylinder so that a hydraulic pressure change is generated in the front wheel brake cylinder by operation of the front wheel brake lever. The connection member has a slit that extends in a moving direction of the transmission member for the front wheel brake during operation of the front wheel brake lever. The transmission member for the front wheel brake has a connection portion with the connection member, wherein the connection portion is movable in the slit of the connection member (a fifth feature).

During operating the front wheel brake lever, the connection portion with the connection member at the transmission member for the front wheel brake moves in the slit of the connection member. In this way, during operating the front wheel brake lever, the transmission member for the front wheel brake can be prevented from pressing the connection member. Therefore, the interlocking wire can be prevented from being pressed through the connection member during operating the front wheel brake lever.

In any one of the first to fifth features, the saddle riding type vehicle further includes a timing adjuster that adjusts timing in which operation force, which is distributed at the operation force distributor, is transmitted to the front wheel brake device such that it is later than timing in which force caused by operation of the interlocking brake lever is transmitted to the rear wheel brake device (a sixth feature).

During operating the interlocking brake lever, the start of activation of the front wheel brake device can be adjusted such that it is later than the start of activation of the rear wheel brake device. In this way, during operating the interlocking brake lever, the front wheel can be prevented from being locked first by the front wheel brake device.

In the sixth feature, the timing adjuster has a restriction member that restricts displacement of the interlocking wire until operation force applied on the interlocking wire exceeds a threshold amount (a seventh feature).

In this way, the sixth feature can readily be carried out. More specifically, displacement of the interlocking wire, that transmits operation force from the operation force distributor to the front wheel brake device, is restricted by the restriction member, so that the start of activation of the front wheel brake device can be adjusted such that it is later than the start of activation of the rear wheel brake device.

In any one of the first to seventh features, the saddle riding type vehicle further includes a displacement restrictor that restricts displacement of the interlocking wire to less than a prescribed amount during operation of the interlocking brake lever (an eighth feature).

When an abnormality such as liquid leakage is caused in the front wheel brake cylinder, operation of the interlocking brake lever readily displaces the interlocking wire and therefore operation force transmission from the interlocking brake lever to the rear wheel brake device may be reduced.

In contrast, as in the above-described structure, the displacement restrictor that restricts displacement of the interlocking wire to less than a prescribed amount is provided, so that displacement of the interlocking wire can be restricted and force caused by operating the interlocking brake lever can be transmitted to the rear wheel brake device sufficiently even with such an abnormality in the front wheel brake cylinder.

In the eight feature, the displacement restrictor is provided on an outer circumferential surface of the front wheel brake cylinder and restricts displacement of the end of the interlocking wire to less than the prescribed amount (a ninth feature).

The rear wheel brake cylinder, the operation force distributor and the like are provided around the interlocking brake lever. In the above-described feature, the displacement restrictor is provided on the outer circumferential surface of the front wheel brake cylinder, so that components can be prevented from gathering around the interlocking brake lever and the structure can be prevented from expanding.

In the eighth or ninth feature, the displacement restrictor is provided in such a position that the interlocking brake lever can be operated while displacement of the interlocking wire is restricted (a tenth feature).

In this way, while displacement of the interlocking wire is restricted by the displacement restrictor, the rear wheel brake device can be activated by the interlocking brake lever. Therefore, when there is an abnormality in the front wheel brake cylinder, the rear wheel can be provided with braking force by the rear wheel brake device.

Thus, in some embodiments, an interlocking brake system structure that provides braking force as designed that acts efficiently in response to operation force even when disk brakes are used for both front and rear wheel brakes.

Other features, elements, steps, characteristics and advantages of embodiments of the present invention will become more apparent from the following detailed description of the preferred embodiments with reference to the attached drawings, in which:

DESCRIPTION OF THE EMBODIMENTS

In the following, an embodiment of the invention will be described in conjunction with the accompanying drawings in which the components are not necessarily accurate about their actual sizes or proportions.

In the following description, the forward, backward, leftward, and rightward refer to these directions as viewed from a rider who seats on a seat of a motorcycle 1 while holding a handle 12.

Overall Structure of Motorcycle

Figure 1:
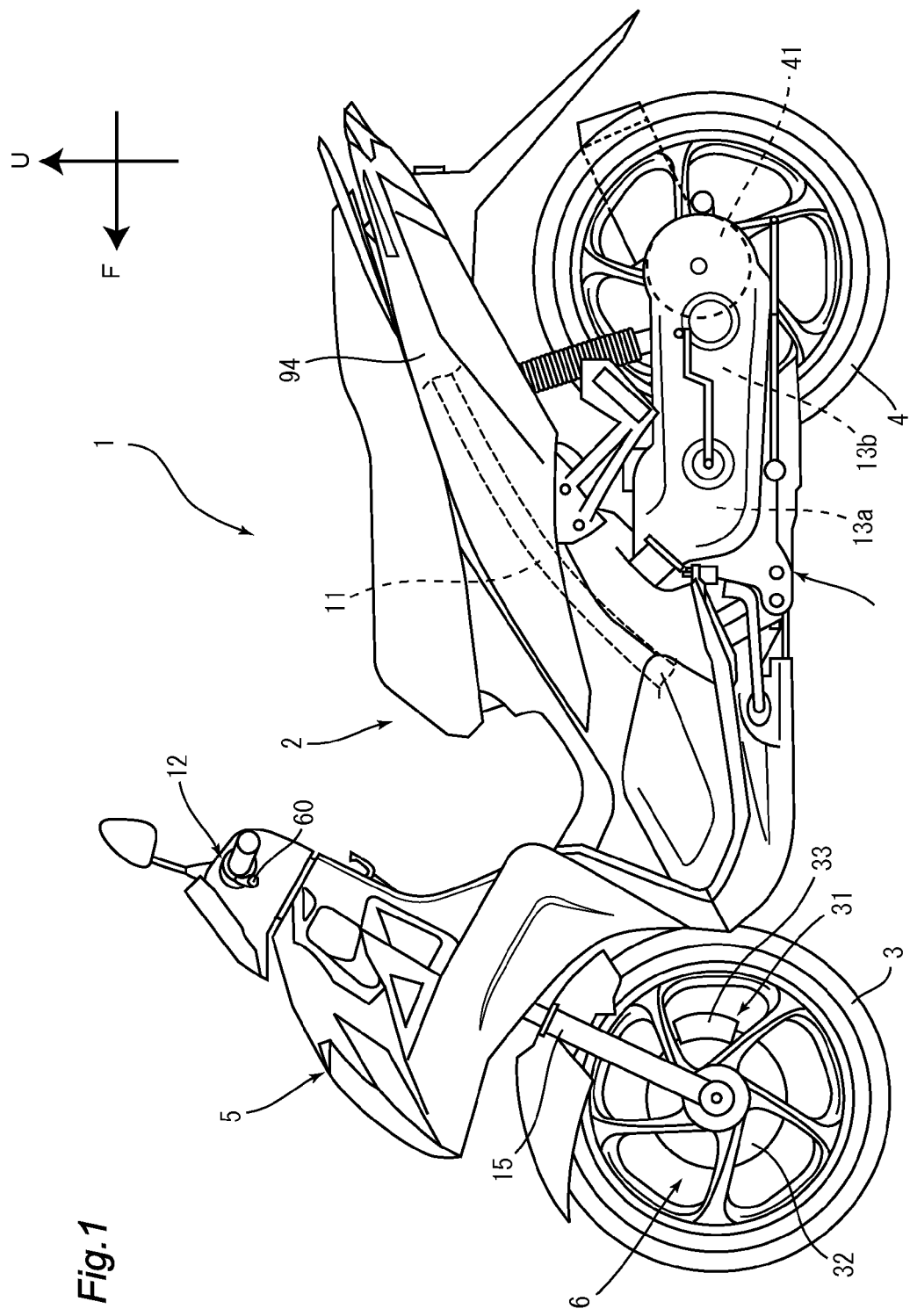
FIG. 1 is a left side view of an overall structure of a motorcycle according to an embodiment of the present invention.

FIG. 1 is a left side view of an overall structure of the motorcycle 1 (saddle riding type vehicle) according to an embodiment of the present invention. The motorcycle 1 includes a vehicle main body 2, a front wheel 3 provided at a front part of the vehicle main body 2, and a rear wheel 4 provided at a rear part of the vehicle main body 2. Note that the arrow F in FIG. 1 indicates a forward direction of the motorcycle 1 and the arrow U indicates an upward direction of the motorcycle 1.

The vehicle main body 2 includes a vehicle body frame 11, a vehicle body cover 5, the handle 12, and a power unit 13. The vehicle main body 2 also includes a brake device 6 that will be described.

The vehicle body frame 11 includes a head pipe, a main frame connected to the head pipe and the like though not specifically shown. The head pipe is provided at the front part of the motorcycle 1.

A steering shaft that is not shown is provided in the head pipe. The handle 12 is provided rotatably with respect to the head pipe on the upper side of the steering shaft. The steering shaft is connected with a pair of front suspensions 15 arranged parallel to each other (see FIG. 1). As shown in FIG. 1, the front wheel 3 is rotatably attached to lower ends of the suspensions 15.

The vehicle body frame 11 having the above-described structure is covered with the vehicle body cover 5. The vehicle body cover 5 is for example made of a resin material.

As shown in FIG. 1, the power unit 13 is positioned between the vehicle body frame 11 and the rear wheel 4. The power unit 13 includes an engine 13a, a driving force transmission device 13b, and the like.

The engine 13a is for example a unit swing type engine and provided so that it can swing up and down together with the rear wheel 4 with respect to the vehicle body frame 11. The driving force transmission device 13b that transmits driving force output from the engine 13a to the rear wheel 4 is provided behind the engine 13a in the vehicle. More specifically, the engine 13a is provided on the front portion of the power unit 13, and the driving force transmission device 13b is provided on the rear portion of the power unit 13. According to the embodiment, the driving force transmission device 13b includes a continuously variable transmission that needs no clutch operation.

Brake Device

Now, a structure of the brake device 6 provided in the motorcycle 1 will be described in detail with reference to FIGS. 2 to 7. Note that in FIGS. 2, 4, 5, and 7, the arrow F indicates a forward direction of the motorcycle 1, the arrow B a backward direction, the arrow R a rightward direction, the arrow L a leftward direction, and the arrow U an upward direction.

Figure 3:
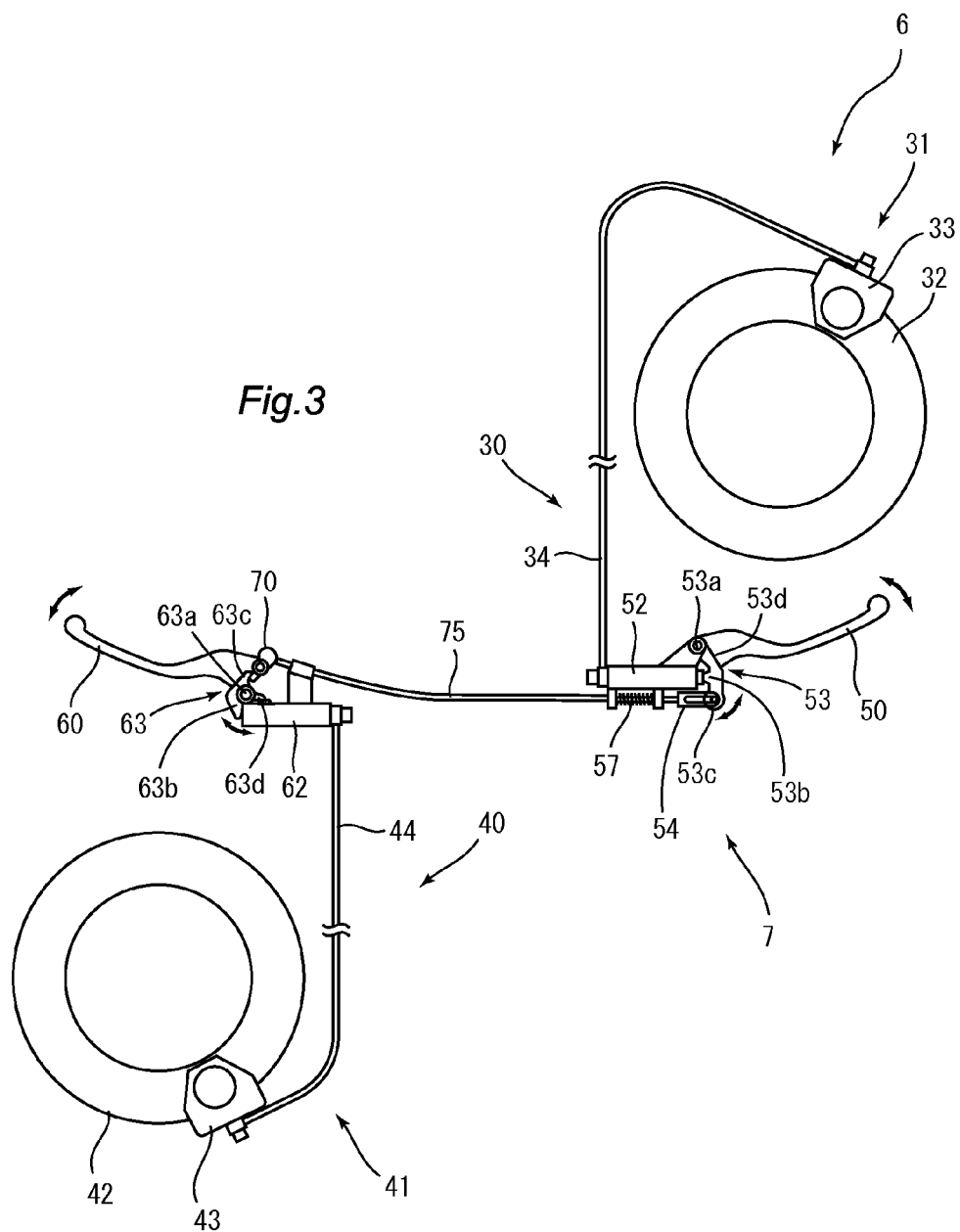
FIG. 3 is a schematic view of an overall structure of brake devices.

FIG. 3 is a schematic view of a general structure of the brake device 6. As shown in FIG. 3, the brake device 6 includes a front wheel brake device 30, a rear wheel brake device 40, and a brake operation mechanism 7. The front wheel brake device 30 includes a front wheel brake 31, a hydraulic pipe 34, and a master cylinder 52 (for the front wheel brake, that is a "front wheel brake cylinder"). The rear wheel brake device 40 includes a rear wheel brake 41, a hydraulic pipe 44, and a master cylinder 62 (for the rear wheel brake, that is a "rear wheel brake cylinder").

The front wheel brake 31 includes for example a disk brake and is provided at the front wheel 3. As shown in FIG. 3, the front wheel brake 31 includes a brake disk 32 and a caliper 33.

The brake disk 32 is supported by the lower ends of the front suspensions 15 so that it can rotate together with the front wheel 3. Although not shown, the caliper 33 is attached to a part of the front suspensions 15 and has brake pads adapted to hold the brake disk 32 therebetween in its thickness wise direction. The brake pads are pressed against the brake disk 32 by hydraulic pressure transmitted through the hydraulic pipe 34. In this way, braking force on the front wheel 3 is generated.

According to the embodiment, the front wheel brake 31 has one brake disk 32 and one caliper 33. However, the front wheel brake 31 may have two or more brake disks and two or more calipers provided corresponding to these brake disks.

Note that the hydraulic pipe 34 is connected to the master cylinder 52 that will be described as shown in FIG. 3 and transmits hydraulic pressure which is generated in the master cylinder 52 by operating the right brake lever 50 or the left brake lever 60 that will be described to the front wheel brake 31.

The rear wheel brake 41 includes for example a hydraulic disk brake similarly to the above-described front wheel brake 31. More specifically, the rear wheel brake 41 includes a brake disk 42 and a caliper 43 as shown in FIG. 3. The rear wheel brake 41 is provided on an inner side of the driving force transmission device 13b in the vehicle-widthwise direction, in other words on an inner side of a rear part of the power unit 13 in the vehicle-widthwise direction.

The brake disk 42 is supported by a swing arm that is not shown so that it can rotate together with the rear wheel 4. The caliper 43 has the same structure as that of the caliper 33 of the front wheel brake 31 and therefore a detailed description thereof will not be provided. Similarly to the brake pads of the caliper 33, the brake pads of the caliper 43 are also pressed against the brake disk 42 by hydraulic pressure transmitted through the hydraulic pipe 44. In this way, braking force on the rear wheel 4 is generated.

Note that as shown in FIG. 3, the hydraulic pipe 44 is connected to the master cylinder 62 that will be described and transmits hydraulic pressure generated in the master cylinder 62 by operating the left brake lever 60 that will be described to the rear wheel brake 41.

Figure 2:
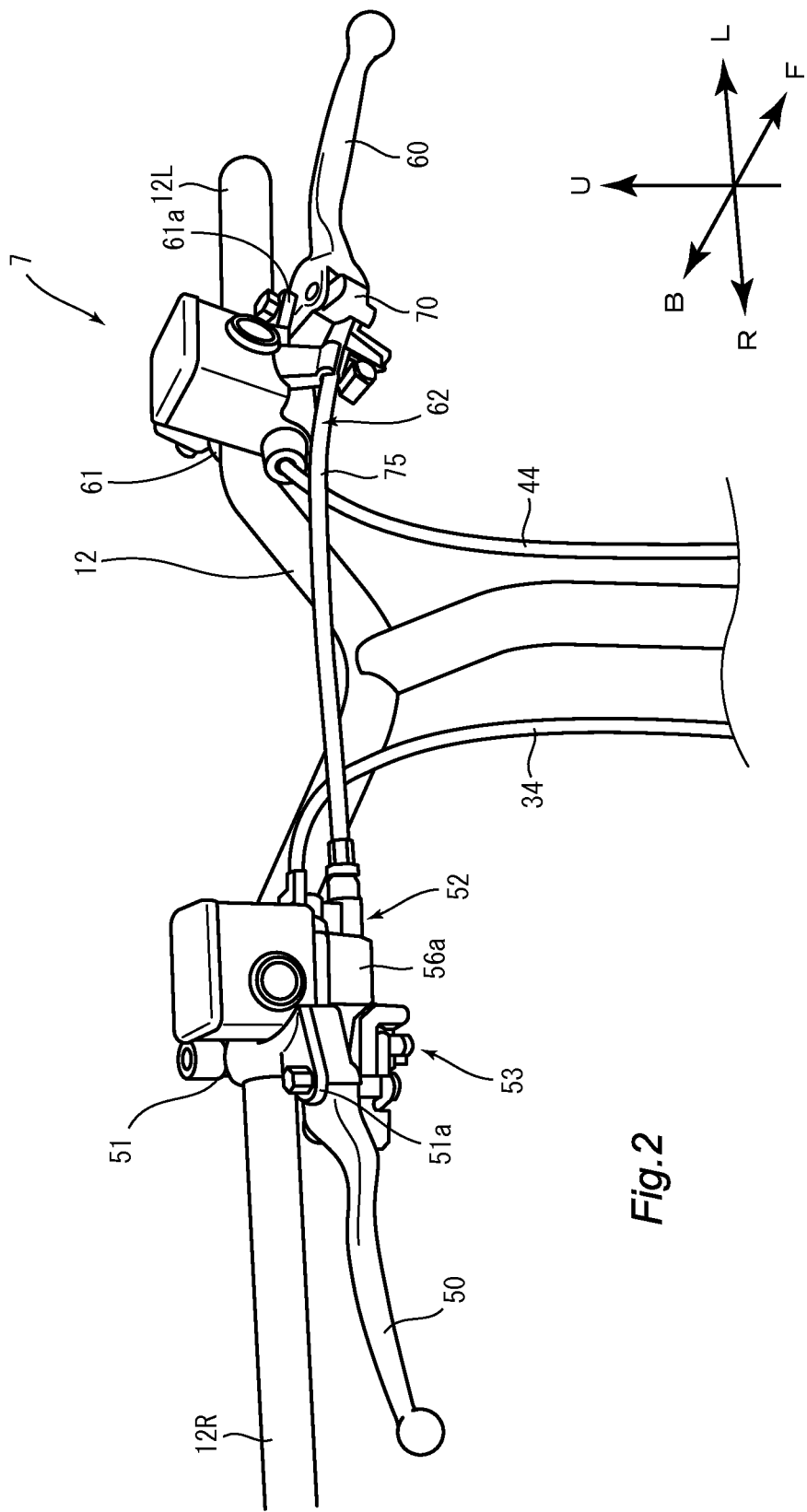
FIG. 2 is a perspective view of a structure surrounding a handle.

FIG. 2 is a schematic view of the handle 12 and the brake operation mechanism 7. The brake operation mechanism 7 is provided at the handle 12. The brake operation mechanism 7 includes a right brake lever 50, a left brake lever 60, fixing members 51 and 61, an equalizer 70 (operation force distributor) and an interlocking wire 75.

As shown in FIG. 2, the handle 12 is provided with the right brake lever 50 as a front wheel brake lever in front of the right handle 12R and the left brake lever 60 as an interlocking brake lever in front of the left handle 12L as viewed from a rider seated on the seat.

Figure 4:
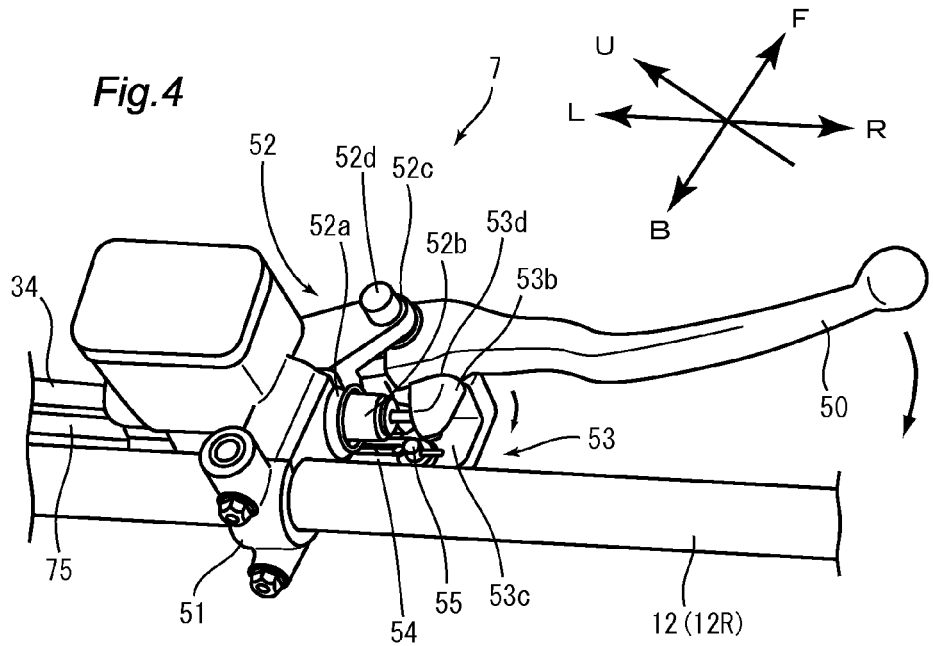
FIG. 4 is a perspective view of a right brake lever as seen from above.

FIG. 4 shows a structure surrounding the right brake lever 50. As shown in FIG. 4, the right brake lever 50 is supported rotatably by the master cylinder 52 attached on the handle 12. More specifically, the right brake lever 50 is attached rotatably to a rotation support 52c of the master cylinder 52 that will be described. In this way, the right brake lever 50 is supported so that it can rotate with respect to the handle 12 around one end of the right brake lever 50. The master cylinder 52 is provided more on a center of the vehicle than the right brake lever 50. The master cylinder 52 is attached to the handle 12 together with the fixing member 51.

The master cylinder 52 includes a cylinder 52a formed inside and a piston 52b provided in the cylinder 52a. The piston 52b of the master cylinder 52 is formed movably in the cylinder 52a for example by lever operation of the right brake lever 50. Note that the master cylinder 52 has a general structure and therefore a detailed description thereof will not be provided.

As shown in FIG. 3, the master cylinder 52 is connected to the caliper 33 of the front wheel brake 31 by the hydraulic pipe 34. More specifically, hydraulic pressure generated in the master cylinder 52 is transmitted to the caliper 33 of the front wheel brake 31 through the hydraulic pipe 34. In this way, as the piston 52b in the master cylinder 52 is pressed inward in the cylinder 52a for example by lever operation of the right brake lever 50, a hydraulic pressure change generated in the master cylinder 52 is transmitted to the caliper 33 of the front wheel brake 31 through the hydraulic pipe 34. The caliper 33 operates to hold the brake disk 32 therebetween when the hydraulic pressure increases. Therefore, the front wheel brake 31 can be activated for example by lever operation of the right brake lever 50.

Therefore, the caliper 33 of the front wheel brake 31 can be driven by operating the right brake lever 50. Therefore, the front wheel brake 31 can be activated by operating the right brake lever 50 to provide braking force on the front wheel 3. A structure surrounding the right brake lever 50 will be described later in detail.

Figure 7:
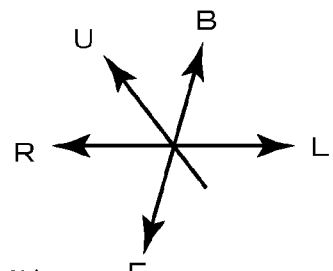
FIG. 7 is a perspective view of a left brake lever as seen from above.
Figure 7:
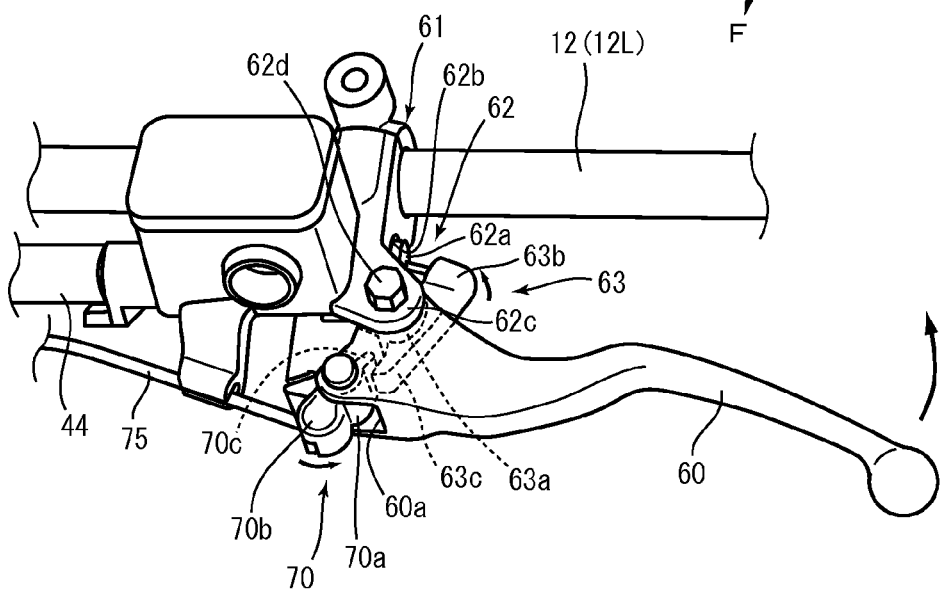

FIG. 7 shows a structure surrounding the left brake lever 60. As shown in FIG. 7, the left brake lever 60 is supported rotatably by the master cylinder 62 attached on the handle 12. More specifically, the left brake lever 60 is attached rotatably to a rotation support 62c of the master cylinder 62 that will be described. In this way, the left brake lever 60 is supported so that it can rotate with respect to the handle 12 around one end of the left brake lever 60. The master cylinder 62 is provided more on the center of the vehicle than the left brake lever 60. The master cylinder 62 is attached to the handle 12 together with the fixing member 61.

The master cylinder 62 includes a cylinder 62a formed inside and a piston 62b provided in the cylinder 62a. The piston 62b of the master cylinder 62 is formed so that it can move in the cylinder 62a for example by lever operation of the left brake lever 60. Note that the master cylinder 62 has a general structure similarly to the master cylinder 52 and therefore a detailed description thereof will not be provided.

As shown in FIG. 3, the master cylinder 62 is connected to the caliper 43 of the rear wheel brake 41 by the hydraulic pipe 44. In this way, as the piston 62b of the master cylinder 62 is pressed inward in the cylinder 62a by lever operation of the left brake lever 60, a hydraulic pressure change generated in the master cylinder is transmitted to the caliper 43 of the rear wheel brake 41 through the hydraulic pipe 44. Therefore, the rear wheel brake 41 can be activated by lever operation of the left brake lever.

The equalizer 70 is provided adjacent to the left brake lever 60 so that lever operation of the left brake lever 60 can also activate the piston 52b of the master cylinder 52. The equalizer 70 is connected with one end of the interlocking wire 75. The other end of the interlocking wire 75 is connected with the pressing member 53 that presses the piston 52b of the master cylinder 52 and that will be described. The equalizer 70 and the interlocking wire 75 will be described in detail.

Operation of the left brake lever 60 allows the master cylinders 52 and 62 to drive the caliper 33 of the front wheel brake 31 and the caliper 43 of the rear wheel brake 41. Therefore, the left brake lever 60 can have the front wheel brake 31 and the rear wheel brake 41 interlocked to give braking force on the front wheel 3 and the rear wheel 4. A structure surrounding the left brake lever 60 will be described later in detail.

Right Brake Lever

A structure surrounding the right brake lever 50 of the brake operation mechanism 7 will be described in detail with reference to FIGS. 3 to 6.

Figure 5:
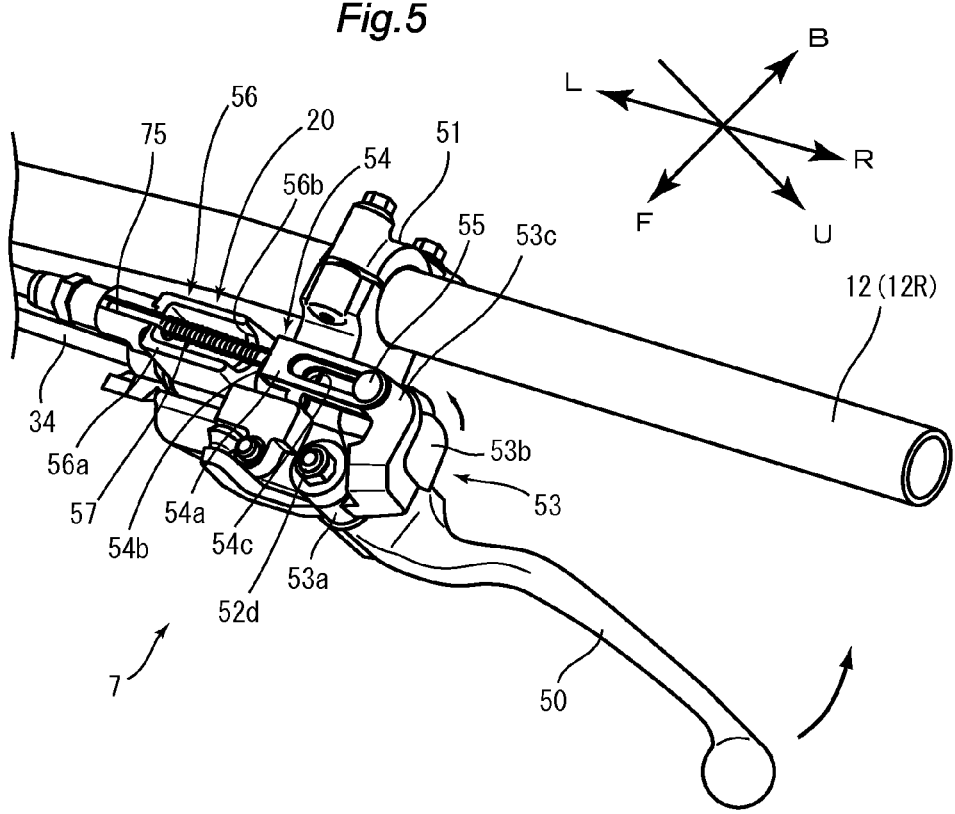
FIG. 5 is a perspective view of the right brake lever as seen from below.

As shown in FIGS. 4 and 5, the brake operation mechanism 7 includes the right brake lever 50, the fixing member 51, the master cylinder 52, the pressing member 53 (transmission member for the front wheel brake), the connection member 54, a pin 55, a stopper 56 (displacement restrictor), and a spring 57 (restriction member).

The right brake lever 50 is a rod-shaped member and has one end supported in a rotatable manner by the fixing member 51 fixed to the handle 12.

The fixing member 51 and the master cylinder 52 are fixed to the handle 12 by bolts or the like. The right brake lever 50 and the pressing member 53 are rotatably attached to the master cylinder 52. More specifically, the master cylinder 52 has the rotation support 52c to which the bolt 52d used to support the right brake lever 50 and the pressing member 53 in a rotatable manner is fixed. In this way, the right brake lever 50 and the pressing member 53 can rotate with respect to the rotation support 52c.

A cylindrical hole is formed in the master cylinder 52. The hole constitutes the cylinder 52a of the master cylinder 52.

The pressing member 53 presses the piston 52b of the master cylinder 52 for example by lever operation of the right brake lever 50. As shown in FIGS. 3 and 4, the pressing member 53 is provided between the right brake lever 50 and the master cylinder 52 so that it can press the piston 52b of the master cylinder 52 for example in response to lever operation of the right brake lever 50.

As described above, the pressing member 53 is attached rotatably with respect to the rotation support 52c of the master cylinder 52 by the bolt 52d. As the pressing member 53 rotates with respect to the rotation support 52c of the master cylinder 52, the piston 52b of the master cylinder 52 can be pressed by the pressing member 53. Note that both the right brake lever 50 and the pressing member 53 can rotate with respect to the rotation support 52c of the master cylinder 52 (see the arrow in FIG. 3).

Figure 6:
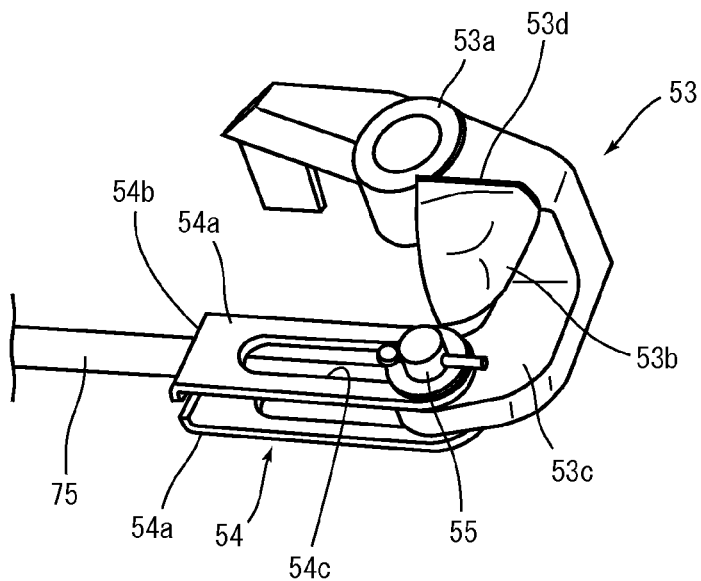
FIG. 6 is a perspective view of a pressing member as seen from above.

FIG. 6 is a perspective view of the pressing member 53 as seen from above. As shown in FIGS. 5 and 6, the pressing member 53 includes a support 53a that is rotatably supported by the rotation support 52c of the master cylinder 52. The pressing member 53 is formed to have an L shape as viewed from above the vehicle so that it extends from the support 53a toward the handle 12 and also from the support 53a toward the center of the vehicle.

As can be understood from FIGS. 4 and 6, the pressing member 53 has a pressing portion 53b that extends from the support 53a toward the handle 12 and a wire connection portion 53c that extends parallel to the pressing portion 53b from the support 53a in a position below the pressing portion 53b. The pressing portion 53b presses the piston 52b of the master cylinder 52 by operation of the right brake lever 50 or in response to operation force transmitted through the interlocking wire 75. As will be described, the wire connection portion 53c is connected with the interlocking wire 75 through the connection member 54. The connection member 54 is connected so that it can slide on the wire connection portion 53c.

The pressing member 53 having the above described structure rotates around the support 53a so that the pressing portion 53b moves toward the center of the vehicle when the wire connection portion 53c is pulled toward the vehicle center of the handle 12 by the interlocking wire 75 (see the arrow in FIGS. 4 and 5) and the pressing portion 53b presses the piston 52b of the master cylinder 52. In this way, the hydraulic pressure in the master cylinder 52 changes and the generated hydraulic pressure change is transmitted to the caliper 33 of the front wheel brake 31 through the hydraulic pipe 34.

The pressing portion 53b has a contact portion 53d that comes into contact with the right brake lever 50 during lever operation of the right brake lever 50. More specifically, as shown in FIGS. 4 and 6, the pressing portion 53b projects more in the upward direction of the vehicle than the other parts so that it contacts the right brake lever 50. A part of the lateral side of the pressing portion 53b constitutes the contact portion 53d.

The pressing member 53 having the contact portion 53d rotates around the support 53a together with the right brake lever 50 during lever operation of the right brake lever 50. The pressing portion 53b presses the piston 52b of the master cylinder 52. In this way, the hydraulic pressure in the master cylinder 52 changes. And then, the generated hydraulic pressure change is transmitted to the caliper 33 of the front wheel brake 31 through the hydraulic pipe 34.

As in the foregoing, the front wheel brake 31 is activated both when the interlocking wire 75 is pulled and when the right brake lever 50 is operated.

As shown in FIGS. 3 and 5, the connection member 54 is provided between the pressing member 53 and the interlocking wire 75. The connection member 54 is a U-shaped member provided so that the wire connection portion 53c of the pressing member 53 is placed therebetween. More specifically, as shown in FIGS. 5 and 6, the connection member 54 has a pair of flat plate portions 54a opposed to each other and a bend portion 54b that integrally connects the pair of flat plate portions 54a. The connection member 54 is provided so that the wire connection portion 53c is placed between the pair of flat plate portions 54a.

The flat plate portions 54a have elliptical slits 54c in opposing positions. The pin 55 is placed through the slits 54c. The pin 55 is fixed to the wire connection portion 53c of the pressing member 53. The slit 54c has a size that allows the pin 55 to move therein. In this way, the connection member 54 can slide on the pressing member 53. More specifically, the slit 54c formed at the flat plate portion 54a of the connection member 54 extends in the moving direction of the pressing member 53. Note that according to the embodiment, the pin 55 through the pressing member 53 forms a connection portion with the connection member 54 at the pressing member 53.

The bend portion 54b of the connection member 54 is connected with one end of the interlocking wire 75. As described above, the connection member 54 is connected to the pressing member 53 in a slidable manner, so that the connection member 54 can be prevented from being pressed by the pressing member 53 when force caused by operating the right brake lever 50 is transmitted to the pressing member 53. More specifically, when force caused by operating the right brake lever 50 is transmitted to the pressing member 53, the pressing member 53 slides on the connection member 54. Therefore, the operation force is not transmitted to the connection member 54. In this way, the interlocking wire 75 can be prevented from being damaged by excess force applied on the interlocking wire 75.

The interlocking wire 75 having one end connected to the connection member 54 passes through the stopper 56 integrally provided at the master cylinder 52 and extends toward the center of vehicle. The stopper 56 is formed on the lower part of the master cylinder 52. The stopper 56 has a side wall 56a that forms a space capable of storing the spring 57 that will be described.

The side wall 56a is formed to have a rectangular shape when viewed from the underside of the vehicle. The part of the side wall 56a that faces the connection member 54 is provided with a notch 56b at which the spring 57 (that will be described) can be placed. The notch 56b is formed so that the connection member 54 connected with one end of the interlocking wire 75 cannot pass therethrough. In this way, the part of the side wall 56a provided with the notch 56b allows the spring 57 and the interlocking wire 75 to move but restricts movement of the connection member 54 connected with one end of the interlocking wire 75. For example, if there is liquid leakage is caused in the master cylinder 52 and the left brake lever 60 is operated, the connection member 54 abuts against the side wall 56a, so that the interlocking wire 75 can be prevented from moving further toward the center of the vehicle. More specifically, the side wall 56a can restrict displacement of the interlocking wire 75 to less than a prescribed amount.

Note that the side wall 56a is provided in such a position that it can restrict displacement of the interlocking wire 75 to less than a prescribed amount. More specifically, the side wall 56a is provided in such a position on an outer circumferential surface of the master cylinder 52 that a hydraulic pressure change can be generated in the master cylinder 62 by braking operation of the left brake lever 60 while the connection member 54 abuts against the side wall 56a. In the position, the left brake lever 60 can be operated while the connection member 54 abuts against the side wall 56a. When the side wall 56a is provided in the position and liquid leakage is caused in the master cylinder 52, a hydraulic pressure change can be generated in the master cylinder 62 by braking operation by the left brake lever 60 to activate the rear wheel brake 41.

On the other hand, the part of the side wall 56a on the center of the vehicle has a hole through which the interlocking wire 75 can pass but the spring 57 that will be described cannot pass. The interlocking wire 75 passes through the hole. As the side wall 56a is arranged in this manner, the part of the side wall 56a on the center of the vehicle can restrict movement of the spring 57.

On the lateral side of the interlocking wire 75 where positions between the connection member 54 and the part of the side wall 56a of the stopper 56 that faces the vehicle center side, the spring 57 is provided. When the interlocking wire 75 and the connection member 54 are pulled toward the vehicle center, the spring 57 is held between the connection member 54 and the side wall 56a of the stopper 56 to generate elastic restoring force.

In this way, if operation force transmitted through the interlocking wire 75 is not more than the elastic restoring force of the spring 57 (at a threshold amount), the connection member 54 does not move and therefore the pressing member 53 does not rotate. On the other hand, if the operation force transmitted through the interlocking wire 75 exceeds the elastic restoring force (at the threshold amount) of the spring 57, the connection member 54 can rotate the pressing member 53 around the support 53a. Therefore, activation of the front wheel brake 31 can be adjusted such that it is later than the timing in which the operation force is transmitted though the interlocking wire 75. Therefore, during lever operation of the left brake lever 60, the front wheel brake 31 can be prevented from being activated and locking the front wheel 3.

As in the foregoing, the master cylinder 52 that supports the right brake lever 50 is provided with the stopper 56, so that components can be prevented from gathering around the left brake lever 60 having the equalizer 70, so that the structure can be prevented from expanding.

According to the embodiment, the spring 57 and the side wall 56a form a timing adjuster 20 that adjusts operation timing for the front wheel brake 31.

Left Brake Lever

A structure surrounding the left brake lever 60 of the brake operation mechanism 7 will be described in detail with reference to FIGS. 3 and 7.

The brake operation mechanism 7 includes the left brake lever 60, the fixing member 61, the master cylinder 62, a pressing member 63, the equalizer 70, and the interlocking wire 75.

The left brake lever 60 is a rod-shaped member having one end supported rotatably by the master cylinder 62 fixed to the handle 12. A groove 60a that extends in the front-back direction of the vehicle is provided on one end of the left brake lever 60.

The fixing member 61 and the master cylinder 62 are fixed to the handle 12 for example by bolts similarly to the fixing member 51 and the master cylinder 52. The left brake lever 60 and the pressing member 63 are connected to the master cylinder 62 in a rotatable manner. More specifically, the master cylinder 62 has the rotation support 62c to which a bolt 62d that supports the left brake lever 60 and the pressing member 63 in a rotatable manner is fixed. In this way, the left brake lever 60 and the pressing member 63 can rotate with respect to the rotation support 62c.

A cylindrical hole is formed in the master cylinder 62. The hole constitutes the cylinder 62a of the master cylinder 62.

The pressing member 63 is a member that presses the piston 62b of the master cylinder 62 by lever operation of the left brake lever 60. As shown in FIGS. 3 and 7, the pressing member 63 is provided between the left brake lever 60 and the master cylinder 62 so that it can press the piston 62b of the master cylinder 62 in response to lever operation of the left brake lever 60.

The pressing member 63 is attached rotatably with respect to the rotation support 62c of the master cylinder 62 by the bolt 62d similarly to the left brake lever 60. The pressing member 63 rotates with respect to the rotation support 62c of the master cylinder 62, so that the pressing member 63 can press the piston 62b of the master cylinder 62. Note that the left brake lever 60 and the pressing member 63 can rotate with respect to the rotation support 62c of the master cylinder 62 (see the arrow in FIG. 3).

As shown in FIG. 7, the pressing member 63 includes a support 63a rotatably supported by the rotation support 62c of the master cylinder 62. The pressing member 63 extends toward the handle 12 (the rear of the vehicle) from the support 63a and also toward the front of the vehicle from the support 63a. The part of the pressing member 63 that extends toward the handle 12 from the support 63a constitutes the pressing portion 63b that presses the piston 62b of the master cylinder 62. The part of the pressing member 63 that extends toward the front of the vehicle from the support 63a constitutes a contact portion 63c that contacts the equalizer 70 that will be described.

More specifically, the pressing member 63 is provided in such a position that the contact portion 63c in contact with the equalizer 70 that will be described and the pressing portion 63b that presses the piston 62b of the master cylinder 62 are positioned on the vehicle front and the vehicle rear, respectively of the support 63a with the support 63a therebetween. The pressing portion 63b rotates around the support 63a when force is transmitted from the equalizer 70 to the contact portion 63c, so that the pressing portion 63b presses the piston 62b of the master cylinder 62.

In this way, when the force caused by operating the left brake lever 60 is transmitted to the contact portion 63c through the equalizer 70, the pressing portion 63b of the pressing member 63 presses the piston 62b of the master cylinder 62. When the piston 62b is pressed, a hydraulic pressure change is generated in the master cylinder 62. The hydraulic pressure change generated in the master cylinder 62 is transmitted to the caliper 43 of the rear wheel brake 41 through the hydraulic pipe 44, so that the rear wheel brake 41 is activated.

The pressing member 63 has a stopper 63d that extends from the support 63a toward the center of the vehicle to cross the extending direction of the pressing portion 63b and the contact portion 63c from the support 63a (see FIG. 3). The stopper 63d contacts the master cylinder 62 so that the left brake lever 60 does not rotate reversely from the direction in which the piston 62b of the master cylinder 62 is pressed when the left brake lever 60 is not operated. In this way, the pressing member 63 can be placed in a prescribed position with respect to the master cylinder 62 while the left brake lever 60 is not lever operation.

As in the foregoing, the pressing member 63 having the pressing portion 63b, the contact portion 63c, and the stopper 63d is formed in a T shape in a plan view (see FIG. 3).

As shown in FIG. 7, the pressing member 63 is provided in the groove 60a formed at one end of the left brake lever 60. More specifically, the pressing member 63 is provided rotatably with respect to the master cylinder 62 in the groove 60a of the left brake lever 60.

Note that when there is liquid leakage in the master cylinder 62, little change is generated in the hydraulic pressure in the master cylinder 62 by lever operation of the left brake lever 60 and pressing the piston 62b of the master cylinder 62 by the pressing member 63. Therefore, little braking force is generated by the rear wheel brake 41.

Figure 8:
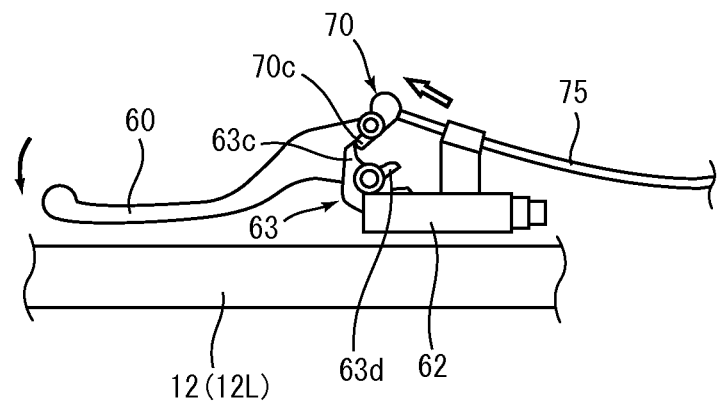
FIG. 8 is a schematic view showing operation of the left brake lever, an equalizer, and the pressing member when there is liquid leakage in a master cylinder for a rear wheel brake.

According to the embodiment, a stroke for the piston 62b is set in the master cylinder 62 so that the left brake lever 60 can be operated even upon a full stroke of the piston 62b by operation of the left brake lever 60 (see FIG. 8). In this way, when there is liquid leakage in the master cylinder 62 and the piston 62b makes full stroke movement, the left brake lever 60 can be operated to draw the interlocking wire 75 (see the void arrow in FIG. 8). Therefore, when there is liquid leakage in the master cylinder 62, the front wheel brake 31 can be activated through the master cylinder 52.

The equalizer 70 is connected rotatably with respect to the left brake lever 60. More specifically, the equalizer 70 has an equalizer support 70a supported rotatably with respect to the left brake lever 60. The equalizer 70 is supported rotatably by the equalizer support 70a in the groove 60a of the left brake lever 60 similarly to the pressing member 63. More specifically, the equalizer 70 is provided in the groove 60a of the left brake lever 60 as it is aligned with the pressing member 63 in the front-back direction of the vehicle.

The equalizer 70 is provided adjacent to the left brake lever 60. In this way, the equalizer 70 is provided adjacent to the left brake lever 60, so that operation force input to the left brake lever 60, or operation force that is caused by an operation of the brake lever, may be transmitted directly to the equalizer 70. Therefore, loss of force between the left brake lever 60 and the equalizer 70 can be prevented. Therefore, the operation force can be transmitted efficiently from the left brake lever 60 to the equalizer 70.

The equalizer 70 includes a wire connection portion 70b that extends from the equalizer support 70a to the outward direction of the groove 60a. The equalizer 70 also includes a projection 70c that extends from the equalizer support 70a to the pressing member 63. The wire connection portion 70b is connected with one end of the interlocking wire 75 and the other end of the wire 75 is connected to the pressing member 53 through the connection member 54. More specifically, the wire connection portion 70b is connected with the connection member 54 positioned in the vicinity of the right brake lever 50 through the interlocking wire 75.

In this way, during lever operation of the left brake lever 60, the equalizer 70 rotates together with the left brake lever 60 to draw the interlocking wire 75. Then, the connection member 54 connected to the interlocking wire 75 is pulled toward the center of the vehicle. As described above, the spring 57 is provided at the lateral side of the interlocking wire 75 and between the connection member 54 and the stopper 56, so that the connection member 54 does not move until the force of drawing the interlocking wire 75 exceeds the elastic restoring force of the spring 57. Therefore, the activation timing of the front wheel brake 31 can be adjusted such that it is later than the lever operation timing of the left brake lever 60.

The projection 70c is provided in contact with the contact portion 63c of the pressing member 63. The projection 70c is in contact with the contact portion 63c so that when operation force is transmitted by the left brake lever 60 to the equalizer 70, part of the operation force is transmitted to the contact portion 63c of the pressing member 63. More specifically, the projection 70c is in contact with the vehicle center of the contact portion 63c of the pressing member 63 in the vehicle-widthwise direction. In this way, the projection 70c is in contact with the vehicle center of the contact portion 63c of the pressing member 63 in the vehicle-widthwise direction, and therefore when the equalizer 70 is pulled to the outer direction in the vehicle-widthwise direction by lever operation of the left brake lever 60 (see the solid arrow in FIG. 7) as shown in FIG. 7, part of the operation force of the left brake lever 60 is transmitted to the pressing member 63 by the projection 70c. As described above, when force is transmitted from the equalizer 70 to the contact portion 63c of the pressing member 63, the pressing member 63 rotates around the support 63a (see the solid arrow in FIG. 7) and the pressing portion 63b presses the piston 52b of the master cylinder 52.

Note that the projection 70c is in contact with the contact portion 63c of the pressing member 63 and therefore when the piston 62b of the master cylinder 62 is stuck in the cylinder 62a, the rotation of the equalizer 70 can be restrained. Therefore, lever-operation of the left brake lever 60 can cause the interlocking wire 75 to be drawn, so that the hydraulic pressure in the master cylinder 52 can be changed.

Figure 9:
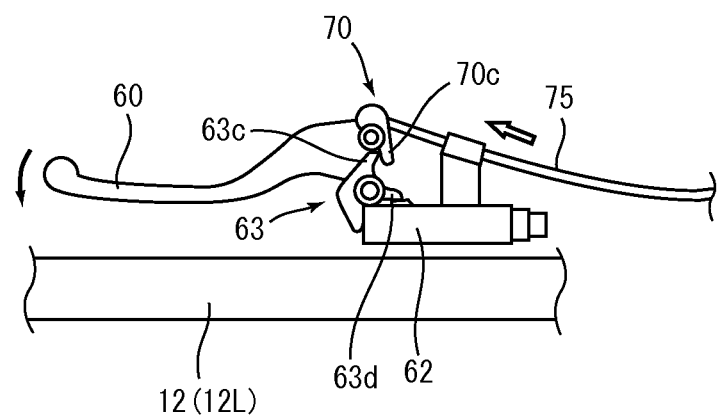
FIG. 9 is a schematic view showing operation of the left brake lever, the equalizer, and the pressing member when the master cylinder for the rear wheel brake is stuck.

More specifically, as shown in FIG. 9, when the master cylinder 62 is stuck, the piston 62b of the master cylinder 62 cannot be pressed by the pressing member 63 even by lever operation of the left brake lever 60, and therefore little braking force is generated by the rear wheel brake 41. At the time, the projection 70c of the equalizer 70 is in contact with the contact portion 63c of the pressing member 63, so that the rotation of the equalizer 70 is restrained. When lever operation of the left brake lever 60 is further carried out in this state, the interlocking wire 75 can be drawn (see the void arrow in FIG. 9). Therefore, the front wheel brake 31 can be activated through the master cylinder 52.

As in the foregoing, the equalizer 70 transmits force which is caused by operating the left brake lever 60 to the master cylinder 52 through the interlocking wire 75, the connection member 54, and the pressing member 53 and also to the master cylinder 62 through the pressing member 63. More specifically, the equalizer 70 distributes the force which is caused by operating the left brake lever 60 between the front wheel brake device 30 and the rear wheel brake device 40.

In the structure described above, during lever operation of the right brake lever 50, the hydraulic pressure in the master cylinder 52 can be raised to activate the front wheel brake 31. During lever operation of the left brake lever 60, the hydraulic pressure in the master cylinder 62 can be raised through the equalizer 70 to activate the rear wheel brake 41 and the hydraulic pressure in the master cylinder 52 may also be raised through the equalizer 70 and the interlocking wire 75 to activate the front wheel brake 31.

The master cylinders 52 and 62 are provided in the vicinities of the right brake lever 50 and the left brake lever 60, respectively. Besides, the interlocking wire 75, that transmits force caused by operating the left brake lever 60, is provided to connect the right brake lever 50 and the left brake lever 60. Therefore, the number of wires that transmits the operation force can be reduced and the length of the wires can be reduced as much as possible.

Therefore, force caused by operating the brakes can be transmitted efficiently to the front wheel brake 31 and the rear wheel brake 41. As a result, braking force as designed can be provided on the front wheel brake 31 and the rear wheel brake 41.

According to the embodiment, the motorcycle 1 includes the front wheel 3; the rear wheel 4; the handle 12 that maneuvers a direction of the front wheel 3; the front wheel brake device 30 that applies a brake on the front wheel 3 or provides a braking action to the front wheel 3; the rear wheel brake device 40 that applies a brake on the rear wheel 4 or provides a braking action to the front wheel 4; the right brake lever 50 provided on one of the left handle 12L and the right handle 12R to activate the front wheel brake device 30; the left brake lever 60 provided on the other of the left handle 12L and the right handle 12R to interlock the front wheel brake device 30 and the rear wheel brake device 40; the equalizer 70 that distributes operation force input to the left brake lever 60 between the front wheel brake device and the rear wheel brake device 40; and the interlocking wire 75 that transmits the operation force distributed at the equalizer 70 to the front wheel brake device 30. The front wheel brake device 30 includes the master cylinder 52 which is provided on the one of the left handle 12L and the right handle 12R together with the right brake lever 50 and in which a hydraulic pressure change is generated by operation of the right brake lever 50 and by transmission of the operation force through the interlocking wire 75; and the front wheel brake 31 that operates in response to the hydraulic pressure change generated in the master cylinder 52. The rear wheel brake device 40 includes the master cylinder 62 which is provided on the other of the left handle 12L and the right handle 12R together with the left brake lever 60 and in which a hydraulic pressure change is generated by operation of the left brake lever 60; and the rear wheel brake 41 that operates in response to the hydraulic pressure change generated in the master cylinder 62.

As described above, the left and right master cylinders 52 and 62 are provided on the left and right of the handle 12, respectively. The master cylinder 62 has a hydraulic pressure change generated by operation of the left brake lever 60. The master cylinder 52 has a hydraulic pressure change generated by operating the right brake lever 50. The master cylinder 52 also has a hydraulic pressure change generated by force caused by operating the left brake lever 60 distributed at the equalizer 70 and transmitted through the interlocking wire 75. In this way, in the above-described structure, the interlocking wire 75 that transmits the operation force is used between the equalizer 70 and the master cylinder 52.

Therefore, in the above-described structure, the number of wires connecting the brake levers and the master cylinders can be reduced and the length of the wires can be reduced as much as possible as compared to the case of employing disk brakes in the conventional structure.

In this way, reduction in operation force transmitted through the wires can be prevented, so that braking force as designed that acts efficiently in response to operation force can be obtained.

According to the embodiment, the equalizer 70 is provided adjacent to the left brake lever 60 so that force which is caused by operation of the left brake lever 60 is directly transmitted thereto. Since the force caused by operation of the left brake lever 60 is transmitted directly to the equalizer 70, loss of the force while being transmitted from the left brake lever 60 to the equalizer 70 can be prevented. In this way, braking force as designed that acts efficiently in response to the operation force can be obtained on the front and rear wheel brake devices 30 and 40.

According to the embodiment, the motorcycle 1 further includes the pressing member 53 provided adjacent to the right brake lever 50 to generate a hydraulic pressure change in the master cylinder 52 by operation of the right brake lever 50. The pressing member 53 is connected to the interlocking wire 75 so that a hydraulic pressure change is generated in the master cylinder 52 also by operation force transmitted through the interlocking wire 75.

Operation of the right brake lever 50 and operation force transmitted through the interlocking wire 75 can be transmitted to the master cylinder 52 by the pressing member 53. In this way, the master cylinder 52 which is provided on one of the left handle 12L and the right handle 12R together with the right brake lever 50 can be activated by the right brake lever 50 and the left brake lever 60.

According to the embodiment, the motorcycle 1 further includes the connection member 54 that connects the interlocking wire 75 and the pressing member 53. The connection member 54 connected to the end of the interlocking wire 75 is connected so that the connection member 54 can transmit operation force transmitted through the interlocking wire 75 to the pressing member 53 and the connection member 54 can move with respect to the pressing member 53 when the right brake lever 50 is operated.

The force, which is caused by operating the left brake lever 60, distributed at the equalizer 70, and transmitted through the interlocking wire 75, is transmitted to the master cylinder 52 by the connection member 54 and the pressing member 53. On the other hand, when the right brake lever 50 is operated, the pressing member 53 moves with respect to the connection member 54 connected to the end of the interlocking wire 75, so that the interlocking wire 75 can be prevented from being pressed through the pressing member 53 by operation of the right brake lever 50. Therefore, the interlocking wire 75 can be prevented from being damaged by excess force applied thereupon.

According to the embodiment, the pressing member 53 is provided rotatably with respect to the master cylinder 52 so that hydraulic pressure is generated in the master cylinder 52 by operation of the right brake lever 50. The connection member 54 has a slit 54c that extends in a moving direction of the pressing member 53 during operation of the right brake lever 50. The pressing member 53 has the pin 55 that constitutes a connection portion with the connection member 54. The pin 55 is provided movably with respect to the connection member 54 in the slit 54c.

During operating the right brake lever 50, the pin that constitutes the connection portion with the connection member 54 at the pressing member 53 moves in the slit 54c of the connection member 54. In this way, during operating the right brake lever 50, the pressing member 53 can be prevented from pressing the connection member 54. Therefore, during operating the right brake lever 50, the interlocking wire 75 can be prevented from being pressed through the connection member 54.

According to the embodiment, the motorcycle 1 further includes the timing adjuster 20 that adjusts timing in which operation force, which is distributed at the equalizer 70, is transmitted to the front wheel brake device 30 such that it is later than timing in which force caused by operation of the left brake lever 60 is transmitted to the rear wheel brake device 40.

When the left brake lever 60 is operated, the start of activation of the front wheel brake device 30 can be adjusted such that it is later than the start of activation of the rear wheel brake device 40. In this way, when the left brake lever 60 is operated, the front wheel 3 can be prevented from being locked first by the front wheel brake device 30.

According to the embodiment, the timing adjuster 20 has the spring 57 that restricts displacement of the interlocking wire 75 until operation force applied on the interlocking wire 75 exceeds a threshold amount. In this way, the structure of the timing adjuster 20 can be implemented easily. More specifically, since displacement of the interlocking wire 75 that transmits the operation force from the equalizer 70 to the front wheel brake device 30 is restricted by the spring 57, the start of activation of the front wheel brake device 30 can be adjusted such that it is later than the start of activation of the rear wheel brake device 40.

According to the embodiment, the motorcycle 1 further includes the stopper 56 that restricts displacement of the interlocking wire 75 to less than a prescribed amount when the left brake lever 60 is operated. If an abnormality such as liquid leakage is caused in the master cylinder 52, the interlocking wire 75 would be easily displaced by operation of the left brake lever 60, and therefore transmission of operation force from the equalizer 70 to the rear wheel brake device 40 may be reduced. In contrast, as in the above described structure, even when there is an abnormality in the master cylinder 52, displacement of the interlocking wire 75 can be restricted by the presence of the stopper 56 that restricts displacement of the interlocking wire 75 to less than a prescribed amount, so that sufficient operation force can be transmitted from the equalizer 70 to the rear wheel brake device 40.

According to the embodiment, the stopper 56 is provided on an outer circumferential surface of the master cylinder 52 to restrict displacement of the end of the interlocking wire 75 to less than the prescribed amount. The master cylinder 62, the equalizer 70 and the like are provided around the left brake lever 60. The stopper 56 is provided on the outer circumferential surface of the master cylinder 52 as described above, so that components can be prevented from gathering around the left brake lever and the structure can be prevented from expanding.

According to the embodiment, the stopper 56 is provided in a position that allows the left brake lever 60 to be operated while displacement of the interlocking wire is restricted. In this way, the rear wheel brake device 40 can be activated by the left brake lever 60 while displacement of the interlocking wire 75 is restricted by the stopper 56. Therefore, if an abnormality is caused in the master cylinder 52, braking force can be applied to the rear wheel 4 by the rear wheel brake device 40.

Other Embodiments

Although the embodiments of the present invention has been described and illustrated in detail, it is clearly understood that the same is by way of illustration and example only. Therefore, the present invention is not limited to the described embodiment and modifications of the embodiment may be carried out without departing the scope and spirit of the present invention.

According to the embodiment described above, the equalizer 70 is provided adjacent to the left brake lever 60 but the equalizer 70 may be provided in a position away from the left brake lever 60. More specifically, the equalizer 70 according to the embodiment is connected with the interlocking wire 75 and supported rotatably with respect to the left brake lever 60. However, as far as operation force input to the left brake lever 60 can be distributed to the front wheel brake device 30, the equalizer may be provided in any arrangement.

According to the embodiment described above, the right brake lever 50 is used as the front wheel brake lever and the left brake lever 60 is used as the interlocking brake lever. However, the right brake lever 50 may be used as the interlocking brake lever and the left brake lever 60 may be used as the front wheel brake lever.

According to the embodiment described above, when the left brake lever 60 is operated, the activation of the front wheel brake 31 is adjusted such that it is later than the activation of the rear wheel brake 41. However, the front wheel brake 31 may be operated first or the front wheel brake 31 and the rear wheel brake 41 may be activated simultaneously.

According to the embodiment described above, the stopper 56 is provided at the master cylinder 52 that supports the right brake lever 50. However, the stopper 56 may be provided at any other member such as the master cylinder 62 that supports the left brake lever 60. Alternatively, the stopper 56 may be formed by any other dedicated component.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A saddle riding type vehicle, comprising:
a front wheel;
a rear wheel;
a handle that includes a left handle and a right handle, and maneuvers a direction of the front wheel, one of the left handle and the right handle being a first handle, and the other of the left handle and the right handle being a second handle;
a front wheel brake device that applies a braking action on the front wheel;
a rear wheel brake device that applies a braking action on the rear wheel;
a front wheel brake lever provided on the first handle to activate the front wheel brake device;
an interlocking brake lever provided on the second handle to interlock the front wheel brake device and the rear wheel brake device;
an operation force distributor that distributes operation force, caused by an operation of the interlocking brake lever, between the front wheel brake device and the rear wheel brake device;
an interlocking wire that receives the distributed operation force, for the front wheel brake device, from the operation force distributor and transmits the received operation force to the front wheel brake device; and
a displacement restrictor that restricts a displacement of the interlocking wire to less than a prescribed amount during the operation of the interlocking brake lever,
wherein the displacement restrictor is disposed at a position relative to the interlocking brake lever so that the interlocking brake lever is operable while displacement of the interlocking wire is restricted,
wherein the front wheel brake device comprises:
a front wheel brake cylinder which is provided on the first handle together with the front wheel brake lever, a hydraulic pressure change being generated in the front wheel brake cylinder by each of
an operation of the front wheel brake lever, and
the transmission of the operation force through the interlocking wire; and a front wheel brake that operates in response to the hydraulic pressure change generated in the front wheel brake cylinder, wherein the rear wheel brake device comprises:
- a rear wheel brake cylinder which is provided on the second handle together with the interlocking brake lever, a hydraulic pressure change being generated in the rear wheel brake cylinder by the operation of the interlocking brake lever; and
- a rear wheel brake that operates in response to the hydraulic pressure change generated in the rear wheel brake cylinder, wherein the operation force distributor includes
- an operation force distributor support supported rotatably with respect to the interlocking brake lever, the operation force distributor support being located on the interlocking brake lever, and
- a wire connection portion that extends from the operation force distributor support.

2. The saddle riding type vehicle according to claim 1, wherein the operation force distributor is connected to the interlocking brake lever so that the operation force caused by the operation of the interlocking brake lever is directly transmitted from the interlocking brake lever to the operation force distributor.

3. The saddle riding type vehicle according to claim 1, further comprising a transmission member for the front wheel brake device, the transmission member being provided adjacent to the front wheel brake lever, the transmission member generating the hydraulic pressure change in the front wheel brake cylinder by the operation of the front wheel brake lever, wherein the transmission member is connected to the interlocking wire so that the hydraulic pressure change in the front wheel brake cylinder is also generated by the operation force transmitted through the interlocking wire.

4. The saddle riding type vehicle according to claim 3, further comprising a connection member that connects the interlocking wire and the transmission member, wherein the connection member is connected to an end of the interlocking wire so that the connection member transmits the operation force transmitted through the interlocking wire to the transmission member, further wherein the connection member is movable with respect to the transmission member during the operation of the front wheel brake lever.

5. The saddle riding type vehicle according to claim 4, wherein the transmission member is provided rotatably with respect to the front wheel brake cylinder so that the hydraulic pressure change in the front wheel brake cylinder is generated by the operation of the front wheel brake lever, wherein the connection member has a slit that extends in a moving direction of the transmission member that the transmission member moves along during the operation of the front wheel brake lever, further wherein the transmission member has a connection portion connected with the connection member, and further wherein the connection portion is movable in the slit of the connection member.

6. The saddle riding type vehicle according to claim 1, further comprising a timing adjuster that adjusts a timing in which the operation force, which is distributed at the operation force distributor, is transmitted to the front wheel brake device through the interlocking wire after the operation force caused by the operation of the interlocking brake lever is transmitted to the rear wheel brake device by the operation force distributor.

7. The saddle riding type vehicle according to claim 6, wherein the timing adjuster has a restriction member that restricts displacement of the interlocking wire until the operation force, that is distributed at the operation force distributor to the interlocking wire, exceeds a threshold amount.

8. The saddle riding type vehicle according to claim 1, wherein the displacement restrictor is provided on an outer circumferential surface of the front wheel brake cylinder and restricts a displacement of an end of the interlocking wire to less than the prescribed amount.

9. The saddle riding type vehicle according to claim 2, further comprising a transmission member for the front wheel brake device, the transmission member being provided adjacent to the front wheel brake lever, the transmission member generating the hydraulic pressure change in the front wheel brake cylinder by the operation of the front wheel brake lever, wherein the transmission member is connected to the interlocking wire so that the hydraulic pressure change in the front wheel brake cylinder is also generated by the operation force transmitted through the interlocking wire.

10. The saddle riding type vehicle according to claim 9, further comprising a connection member that connects the interlocking wire and the transmission member, wherein the connection member is connected to an end of the interlocking wire so that the connection member transmits the operation force transmitted through the interlocking wire to the transmission member, and further wherein the connection member is movable with respect to the transmission member during the operation of the front wheel brake lever.

11. The saddle riding type vehicle according to claim 10, wherein the transmission member is provided rotatably with respect to the front wheel brake cylinder so that the hydraulic pressure change in the front wheel brake cylinder is generated by the operation of the front wheel brake lever, wherein the connection member has a slit that extends in a moving direction of the transmission member that the transmission member moves along during the operation of the front wheel brake lever, further wherein the transmission member has a connection portion with the connection member, and further wherein the connection portion is movable in the slit of the connection member.

12. The saddle riding type vehicle according to claim 2, further comprising a timing adjuster that adjusts a timing in which the operation force, which is distributed at the operation force distributor, is transmitted to the front wheel brake device through the interlocking wire after the operation force caused by the operation of the interlocking brake lever is transmitted to the rear wheel brake device by the operation force distributor.

13. The saddle riding type vehicle according to claim 12, wherein the timing adjuster has a restriction member that restricts displacement of the interlocking wire until the operation force, that is distributed at the operation force distributor to the interlocking wire, exceeds a threshold amount.

14. The saddle riding type vehicle according to claim 2, further comprising a displacement restrictor that restricts a displacement of the interlocking wire to less than a prescribed amount during the operation of the interlocking brake lever.

15. The saddle riding type vehicle according to claim 14, wherein the displacement restrictor is provided on an outer circumferential surface of the front wheel brake cylinder and restricts a displacement of an end of the interlocking wire to less than the prescribed amount.

16. The saddle riding type vehicle according to claim 14, wherein the displacement restrictor is disposed at a position relative to the interlocking brake lever so that the interlocking brake lever is operable while displacement of the interlocking wire is restricted.

17. The saddle riding type vehicle according to claim 15, wherein the displacement restrictor is disposed at a position relative to the interlocking brake lever so that the interlocking brake lever is operable while displacement of the interlocking wire is restricted.

18. The saddle riding type vehicle according to claim 1, wherein the operation force distributor further includes a projection that extends from the operation force distributor support, the projection being provided so as to press a piston of the rear wheel brake cylinder by an operation force input to the interlocking brake lever.

\* \* \* \* \*